Aug. 7, 1945.   G. C. HOLMES   2,381,053
PROCESS OF TREATING MAGNESIAN ORES AND MINERALS
Filed April 4, 1942
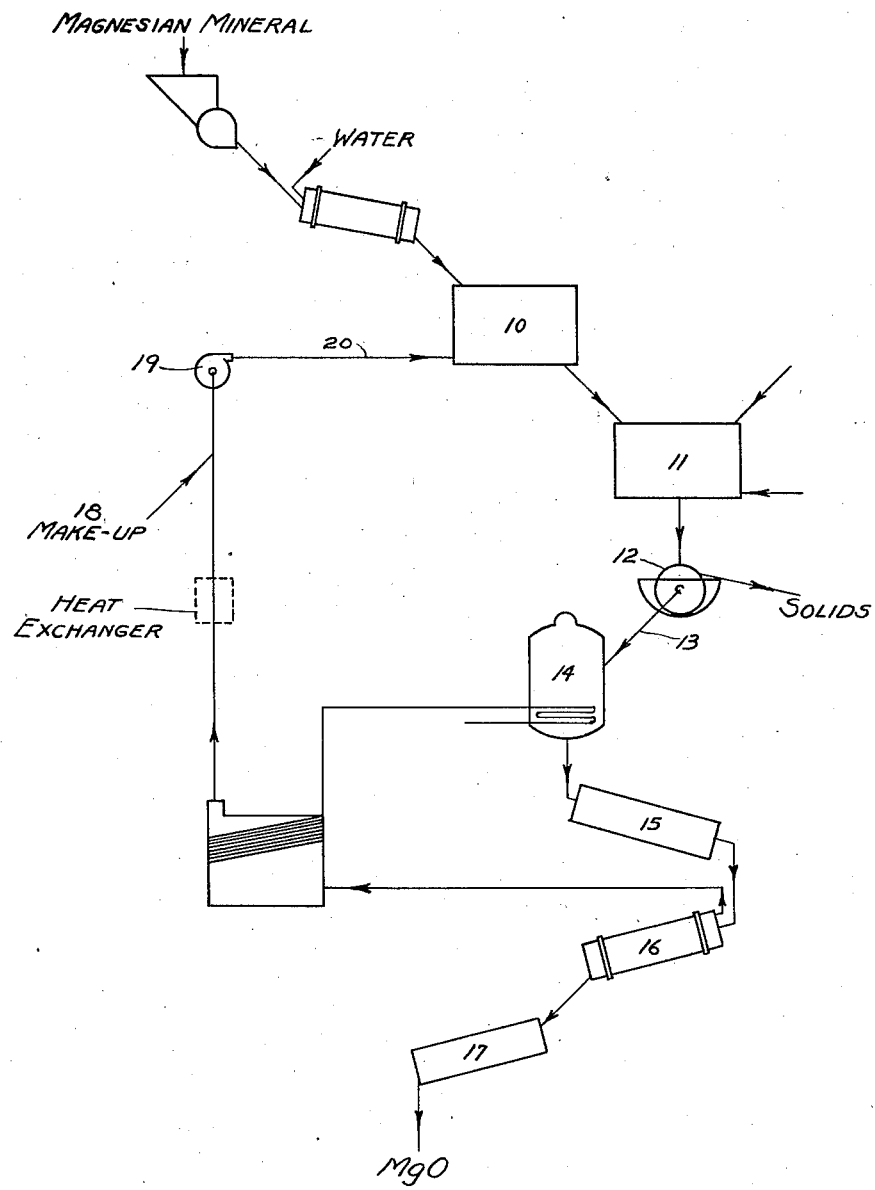
GORDON C. HOLMES
INVENTOR.
BY Patented Aug. 7, 1945

2,381,053

UNITED STATES PATENT OFFICE 2,381,053

PROCESS OF TREATING MAGNESIAN ORES AND MINERALS

Gordon C. Holmes, Los Angeles, Calif.

Application April 4, 1942, Serial No. 437,663

2 Claims. (Cl. 23—201)

This invention pertains to a process of treating magnesian ores and is principally directed to the recovery of magnesium oxide therefrom. More specifically, the present invention is directed to the production of magnesium oxide, in a form suitable for use as a source of magnesium metal, although the oxide produced may also be employed as a refractory or source of refractory magnesium oxide.

The process of the present invention is particularly adapted to the treatment of the relatively large but impure deposits of magnesite and other deposits containing large amounts of magnesia in the form of carbonate, sometimes associated with the hydroxide and silicate. Magnesite deposits as mined do not meet the high purity requirements of existing magnesium reduction processes and the present invention provides a method of treating these magnesian minerals so as to permit the production of magnesium oxide of sufficiently high purity to permit its ready use in the manufacture of magnesium metal at a reasonable cost.

Generally stated, the process of the present invention contemplates the formation of a suspension of magnesian minerals in an aqueous medium, followed by the step of converting the magnesium carbonates into a form capable of being solubilized for ready removal and separation from the impurities normally present in the starting ore, such as for example, silica, iron, calcium and the like.

Moreover, the present invention employs but a single reagent which is recovered and used in cyclic operation of the process, thereby materially reducing the cost of the operation. Furthermore, the process contemplates the use of but relatively small amounts of aqueous medium, thereby obviating the necessity of evaporating large amounts of water. The process contemplates the conversion of magnesium carbonates in suspension within an aqueous medium into a suspension of magnesium sulfite, which suspension is then converted into a solution by a simple solubilizing step, the resulting solution now containing magnesium sulfate which can be readily separated from the remaining solid impurities.

An object of the present invention, therefore, is to disclose and provide a method of treating magnesian ores and minerals by a substantially continuous process for the recovery of magnesium oxide.

Another object of the invention is to disclose and provide a process of treating magnesian ores and minerals for the recovery of magnesium oxide by the use of a reagent which is recovered and repeatedly employed in cyclic operation of the process.

A further object of the invention is to disclose and provide a method of recovering magnesium oxide from magnesite and similar ores containing magnesium carbonate.

A further object of the present invention is to disclose and provide conditions and reagents whereby magnesia in the form of a suspension is readily solubilized and separated from naturally occurring impurities in a ready facile and economical manner.

These and other objects and advantages of the present invention will become apparent to those skilled in the art from the following detailed description, reference being had to the appended diagrammatic representation of the various steps employed.

Magnesite is the most commonly available source of magnesia adapted for use in the process of this invention. All magnesite deposits contain impurities such as alumina, iron, lime and the like, the quantity thereof varying not only with the location of the deposit but within a given deposit and such variation is taken into consideration by the present process.

The magnesite is first crushed in any suitable mill or crusher to about ½ inch or 1 inch size and is then ground, preferably with water, to a state of fine division. Although the process may be employed on all magnesian ores ground to pass a 60 or 80 mesh sieve, best results are attained by grinding the natural mineral to a finer state of division, say so as to pass a 120 or 150 mesh sieve. The extent to which the mineral is crushed before being ground may vary with the type and character of grinding mill employed. Ball mills are eminently suited for the fine grinding operation and when the grinding is carried out in the presence of water, the resulting slurry or suspension may be discharged directly from the ball mills into vats or tanks. It has been found highly desirable to employ relatively thick suspensions containing ore in an amount sufficient to supply from 10 to 14 parts of water to 1 part of MgO, by weight. One of the characteristics of the present process is its ability to handle relatively heavy suspensions, thereby eliminating problems incidental to the removal of large quantities of water in subsequent stages of the process.

The MgO content of the ore and the amount thereof in suspension is determined periodically so that the conversion of the magnesium carbonate into magnesium sulfite can be controlled. Sulfur dioxide gas is supplied to the tank containing the suspension in the proportion of 1 mol of sulfur dioxide per mol of MgO in the suspension. Moreover, the contents of the tank 10 are mechanically agitated while the sulfur dioxide is passed thereinto, the rate at which sulfur dioxide is admitted into the suspension being not materially in excess of that at which it is absorbed therein. It has been found that by maintaining the rate and quantity within the limits herein specified, the suspension is maintained at a pH of not less than about 6 and the magnesium carbonate is converted into normal magnesium sulfite without material loss of sulfur dioxide. The major proportion of magnesium sulfite thus formed will be maintained in suspension within the aqueous medium, the amount of water present being insufficient to dissolve the sulfite.

It may be noted that calcum and aluminum sulfates will also be formed and this should be taken into consideration in regulating the amount of $SO_2$ passed into the suspension.

The slurry or suspension may then be discharged into a solubilizing tank 11 wherein the magnesia content of the suspension is rendered soluble by agitating the suspension with air. Agitation is continued until substantially all of the magnesium sulfite has been converted into magnesium sulfate, whereupon a small amount of finely divided magnesium carbonate or crude magnesite in finely divided form is added to the contents of tank 11 and the solution, together with solids contained therein, is filtered in any suitable manner as, for example, by means of continuous drum-type filters 12. Solid impurities, such as for example, calcium sulfate, aluminum silicate, iron compounds, silica and the like, are thus separated from a solution consisting essentially of magnesium sulfate, the solution being discharged by line 13 to a suitable evaporator 14. The evaporation of the concentrated solution may be carried out in any suitable type of apparatus and if a purity not in excess of about 99.5 is desired, the entire solution may be evaporated to dryness, leaving a mass of magnesium sulfate in hydrous form. This mass may then be sent through a drying kiln 15 and dried therein at a temperature not in excess of about 400° C. for the purpose of eliminating water of crystallization. The substantially anhydrous material is then sent to a calcining kiln 16 wherein calcination is carried out at a temperature of between about 850° C. and 1200° C. under mildly reducing conditions and preferably countercurrent to the flow of heated gases through the kiln (in the event a rotary calciner is employed).

The character of the atmosphere within the kiln and of the exhaust gases should be controlled. It has been found that when mildly reducing conditions are maintained, the gases discharged from the calcining zone contain sulfur dioxide without appreciable quantities of carbonyl sulfide, sulfur trioxide or elemental sulfur. The calcined material is then cooled as indicated at 17, and the product discharged from the cooler will be found to be substantially pure magnesium oxide.

The control of the temperature and atmospheric conditions during calcination is of considerable importance since operation under the specified conditions permits the stack-gases to be passed as by line 18 through a waste heat boiler and heat exchangers, and be reused in cyclic operation of the process by passing such gases as by blower 19 and line 20 into the tank or tanks 10. The hot gases discharged from the calcining kiln may be employed in the evaporators 14, the heat exchanger indicated on the diagram indicating either a separate heat exchanger or a heat exchange relationship of the gases with any desired equipment, such as for example, the evaporator 14. Make-up sulfur dioxide may be supplied to the line 18 or to the suction side of the blower 19.

The addition of finely divided magnesite or magnesium carbonate to the solution resulting from the solubilizing step facilitates filtration and the removal of impurities from the solution.

In the event it is desired to produce magnesium oxide of extremely high purity, then the filtered solution may be sent to crystallizing pans and by crystallization and washing magnesium sulfate of absolute purity may be obtained, such magnesium sulfate upon drying and calcination as hereinabove described, resulting in magnesium oxide of substantially 100% purity.

It is to be noted that the drying and calcining operations are conducted in separate units, thereby eliminating the formation of large quantities of sulfuric acid and obviating the problems of corrosion which would normally arise. Moreover, by carrying out the drying and calcining operations in separate units, the calcining operation may be carried out under the controlled conditions hereinbefore disclosed, thereby permitting the recovery of the sulfur dioxide for reuse in the process. Unless the sulfur dioxide is recovered and reused in the manner described, the costs of the process would make it impossible to produce magnesium oxide economically.

It is to be understood that the calcining operation is preferably conducted at a temperature insufficiently high to sinter the resulting magnesium oxide but in the event the product is to be used as a basic refractory, temperatures sufficiently high to cause sintering may be employed.

The process of the present invention is applicable to the treatment of various magnesian minerals, even those which have heretofore been deemed to be unsuitable as a source of magnesium and incapable of being used in the production of magnesium metal. Although the term "magnesite" has been used in describing the process, it is to be understood that other magnesian ores, such as brucite and the like, may also be employed in the process.

All changes and modifications coming within the scope of the appended claims are embraced thereby.

I claim:

1. A continuous method of producing magnesium oxide from magnesian ores, comprising: forming a suspension of magnesian minerals in finely divided form in an aqueous medium, said suspension containing magnesian minerals in amount sufficient to supply 1 part of magnesium oxide to 10 to 14 parts of aqueous medium, by weight; passing sulfur dioxide into the suspension at the rate of 1 mol for each mol of magnesium oxide in said suspension and at a rate not materially in excess of that at which sulfur dioxide may be absorbed by the suspension to maintain the suspension at a pH of not less than 6, whereby said suspension is converted into a suspension of magnesium sulfite; solubilizing the sulfite suspension thus produced by passing air therethrough; removing solids from the solubilized suspension; evaporating the filtrate in the absence of foreign solids; drying the evaporated filtrate and separately calcining the dried magnesium sulfate in the absence of foreign solids under mildly reducing conditions to produce magnesium oxide whereby gases discharged from the calcining zone contain sulfur dioxide without appreciable quantities of sulfur trioxide, carbonyl sulfide and elemental sulfur; and recycling the gases containing sulfur dioxide generated during calcination into repeated contact with further suspensions of magnesian minerals.

2. In a continuous process of treating magnesian ores for the production of magnesium oxide, wherein magnesian ores in aqueous suspension are treated with sulfur dioxide to form magnesium sulfite and such sulfite then solubilized with air to form sulfate, the steps of: removing solids from the solution of magnesian sulfate, evaporating and drying the filtrate to form magnesium sulfate substantially free from foreign solids, calcining the magnesium sulfate in a separate calcining zone in the absence of foreign solids and under reducing conditions to form magnesium oxide and gases containing sulfur dioxide without appreciable quantities of sulfur trioxide, carbonyl sulfide and elemental sulfur, and using said gases thus produced in continuous treatment of further suspensions of magnesian ores.

GORDON C. HOLMES.